(12) United States Patent
MacArthur et al.

(10) Patent No.: US 10,240,629 B2
(45) Date of Patent: Mar. 26, 2019

(54) HOOK AND METHODS OF ASSEMBLING AND USING THE SAME

(71) Applicant: Honda Motor Co., Ltd., Tokyo (JP)

(72) Inventors: Benjamin B. MacArthur, Barrie (CA); Dwayne Switzer, Angus (CA)

(73) Assignee: Honda Motor Co., Ltd., Tokyo (JP)

( * ) Notice: Subject to any disclaimer, the term of this patent is extended or adjusted under 35 U.S.C. 154(b) by 24 days.

(21) Appl. No.: 15/637,486

(22) Filed: Jun. 29, 2017

(65) Prior Publication Data
US 2019/0003521 A1    Jan. 3, 2019

(51) Int. Cl.
*B66C 1/36* (2006.01)
*F16B 45/02* (2006.01)
*B66C 1/34* (2006.01)
*B65G 19/02* (2006.01)

(52) U.S. Cl.
CPC .............. *F16B 45/025* (2013.01); *B66C 1/36* (2013.01); *B65G 19/02* (2013.01); *B66C 1/34* (2013.01)

(58) Field of Classification Search
CPC .................................................. F16B 45/025
USPC ........... 294/82.23, 82.1, 82.11, 82.13, 82.14, 294/82.17; 24/599.8, 599.9, 600.8; 59/93
See application file for complete search history.

(56) References Cited

U.S. PATENT DOCUMENTS

| 705,526 | A | * | 7/1902 | Gray | |
|---|---|---|---|---|---|
| 1,010,952 | A | | 12/1911 | Purves | |
| 1,650,038 | A | | 11/1927 | Potter | |
| 1,667,927 | A | | 5/1928 | Clarke | |
| 1,813,294 | A | * | 7/1931 | Hunt | B66C 1/34 294/82.33 |
| 2,333,351 | A | * | 11/1943 | Welch | B66C 1/48 294/104 |
| 2,618,505 | A | * | 11/1952 | Rosenbaum | B66C 1/48 294/104 |
| 2,872,717 | A | | 2/1959 | Kelley | |
| 3,174,790 | A | * | 3/1965 | Bendl | B64D 1/22 294/104 |
| 3,539,217 | A | * | 11/1970 | Szekely | B64D 1/22 294/82.33 |
| 3,722,943 | A | | 3/1973 | Kalua | |

(Continued)

OTHER PUBLICATIONS

"Self-Locking Safety Hook" https://www.aliexpress.com/item/1-12T-G80-eye-self-locking-safety-hook-industrial-grade-lifting-rigging-hardware-forged-alloy-steel/32642955891.html?spm=2114.40010508.4.13.fbR3y6 (Accessed Mar. 24, 2017). 8 pages.

*Primary Examiner* — Paul T Chin
(74) *Attorney, Agent, or Firm* — Armstrong Teasdale LLP

(57) ABSTRACT

A hook for lifting a component includes a hook body and a latch. The hook body includes a coupling portion having an elongate aperture defined therein for receiving at least a portion of a chain, and an engaging portion extending from the coupling portion, the engaging portion defining a hook opening sized for receiving a first portion of the component therein. The latch is pivotably coupled to the coupling portion and pivotable between a first position and a second position relative to the hook body. The latch occludes the hook opening in the second position. The latch defines a chain aperture that is aligned with the elongate aperture such that the portion of the chain extends through each of the elongate aperture and the chain aperture and causes the latch to pivot between the first and second positions in response to a load being applied to the hook.

21 Claims, 5 Drawing Sheets

(56) References Cited

U.S. PATENT DOCUMENTS

| | | | |
|---|---|---|---|
| 3,940,173 A | 2/1976 | Ulbing | |
| 4,039,219 A | 8/1977 | Bugman | |
| 4,073,042 A | 2/1978 | Miller | |
| 4,765,667 A * | 8/1988 | Hamrin | B66C 1/36 294/82.2 |
| 5,205,600 A * | 4/1993 | Moore | B63B 21/60 294/82.27 |
| 5,271,128 A * | 12/1993 | Storm | B66C 1/36 24/600.1 |
| 5,292,165 A | 3/1994 | Wiklund | |
| 5,899,512 A | 5/1999 | Wiklund | |
| 6,375,242 B1 * | 4/2002 | Zingerman | B66C 1/36 294/82.3 |
| 6,832,417 B1 | 12/2004 | Choate | |
| 7,647,677 B2 * | 1/2010 | Casebolt | F16B 45/02 24/600.1 |
| 2005/0127695 A1 * | 6/2005 | Cranston | B66C 1/34 294/82.3 |
| 2011/0126386 A1 * | 6/2011 | Liang | F16B 45/02 24/599.5 |

* cited by examiner

HOOK AND METHODS OF ASSEMBLING AND USING THE SAME

BACKGROUND

The present disclosure relates generally to transport systems for assembly lines, and, more specifically, to hooks for coupling components to transport systems to facilitate moving the components to different stations of an assembly line.

At least some production or assembly lines employ conveyors to transport components between different stations of the production line. Some known conveyors are mounted to a horizontal rail, and roll along that rail to move components between stations on the production line. At least some known conveyors include a chain that is coupled to the component via one or more hooks. In use, known hooks may be difficult to secure to the component. Consequently, the hook may shift in use, causing the component to shift along a portion of the hook not designed to bear the full load of the component, or the hook may undesirably de-couple from the component.

BRIEF SUMMARY

In one aspect, a hook for lifting a component is provided. The hook includes a hook body, the hook body including a coupling portion having an elongate aperture defined therein for receiving at least a portion of a chain, and an engaging portion extending from said coupling portion. The engaging portion defines a hook opening sized for receiving a first portion of the component therein. The hook also includes a latch pivotably coupled to said coupling portion and pivotable between a first position and a second position relative to said hook body. The latch occludes the hook opening in the second position. The latch defines a chain aperture that is aligned with said elongate aperture such that the portion of the chain extends through each of said elongate aperture and said chain aperture and causes said latch to pivot between the first and second positions in response to a load being applied to said hook.

In another aspect, an apparatus for coupling a component to a transport system is provided. The apparatus includes a positioning arm having a first end and an opposing second end. The positioning arm includes a handle at said first end. The apparatus also includes a hook coupled to said second end of said positioning arm. The hook includes a hook body, the hook body including a coupling portion having an elongate aperture defined therein for receiving at least a portion of a chain, and an engaging portion extending from said coupling portion. The engaging portion defines a hook opening sized for receiving a first portion of the component therein. The hook also includes a latch pivotably coupled to said coupling portion and pivotable between a first position and a second position relative to said hook body. The latch occludes the hook opening in the second position. The latch defines a chain aperture that is aligned with said elongate aperture such that the portion of the chain extends through each of said elongate aperture and said chain aperture and causes said latch to pivot between the first and second positions in response to a load being applied to said hook.

In yet another aspect, a method of assembling a hook is provided. The method includes positioning a latch relative to a hook body such that a chain aperture defined in the latch is aligned with an elongate aperture defined in a coupling portion of the hook body. The hook body includes an engaging portion extending from the coupling portion and defining a hook opening sized for receiving a portion of a component therein. The method also includes pivotably coupling the latch to the hook body such that the latch is pivotable between a first position and a second position relative to said hook body in response to a load being applied to the hook. The latch occludes the hook opening in the second position.

DETAILED DESCRIPTION

The present disclosure relates generally to transport systems for use with assembly lines, and, more specifically, to hooks for use in securely coupling components to transport systems to enable the components to be moved to different stations along an assembly line. As described in more detail below, at least some exemplary embodiments of the hook include a hook body, a latch pivotably coupled to the hook body, and a biasing element coupled to the latch. The biasing element maintains the latch in a first, open position when no load is applied to the hook. When a load is applied to the hook (e.g., when the component is being lifted and/or transported), the latch pivots with respect to the hook body to securely close an opening of the hook, preventing the component from de-coupling from the hook.

Figure 1:
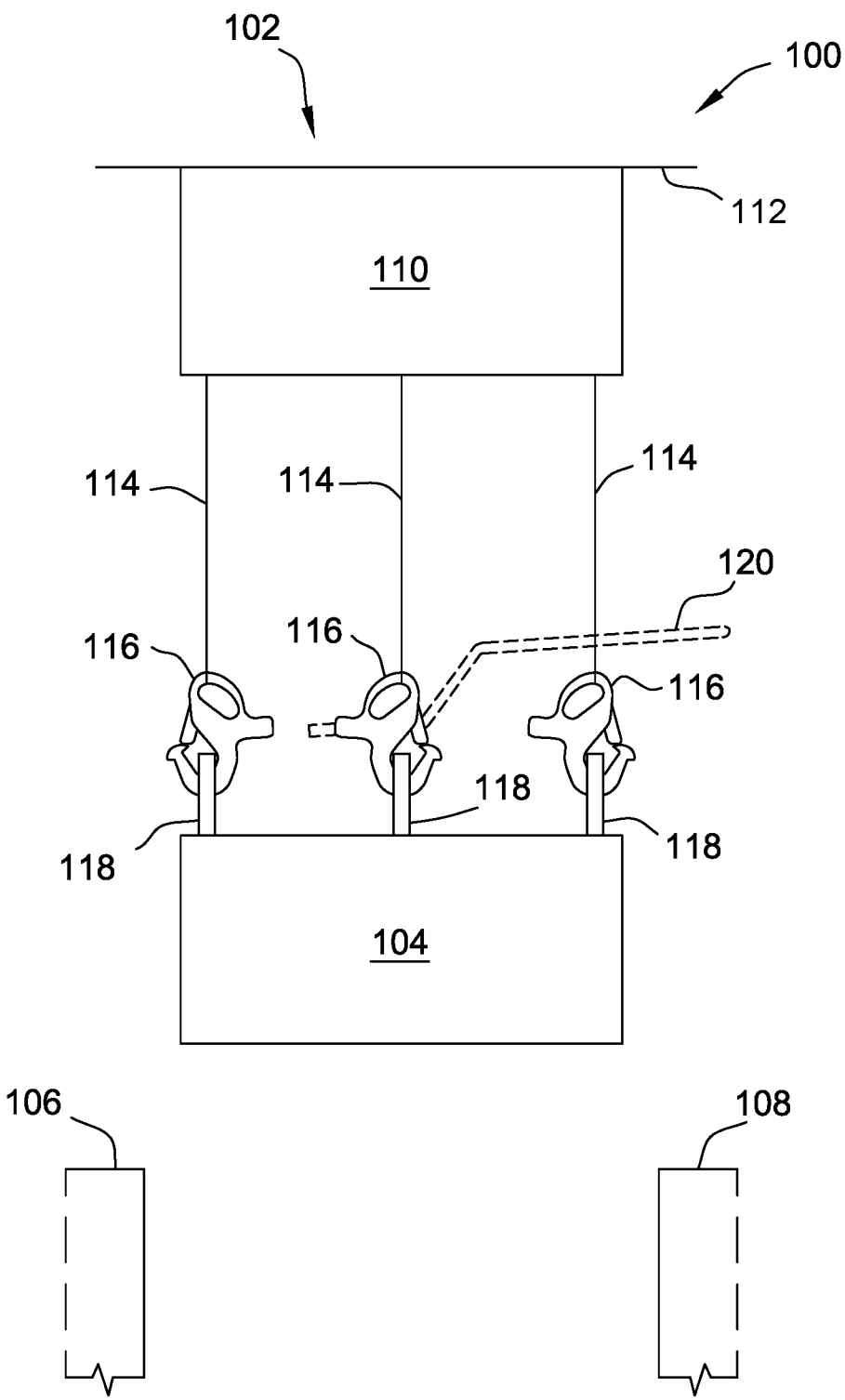
FIG. 1 is a schematic diagram of a portion of an exemplary automotive assembly line.

FIG. 1 is a schematic diagram of an exemplary automotive assembly line 100. In the exemplary embodiment, automotive assembly line 100 includes a transport system 102 that transports an automotive component 104 from a first station 106 to a second station 108. Automotive component 104 may be, for example and without limitation, an engine, a transmission, and/or an engine-transmission assembly. In the exemplary embodiment, transport system 102 includes a conveyor or carriage 110 rollably or slidably coupled to a rail 112. Conveyor 110 is configured to travel between at least first station 106 and second station 108 along rail 112. Transport system 102 also includes a plurality of chains 114 coupled to conveyor 110 and hanging or extending downward therefrom. Each chain 114 is coupled to a respective hook 116, and each automotive component 104 includes a plurality of brackets 118 extending therefrom. In the exemplary embodiment, transport system 102 transports automotive component 104 by coupling hooks 116 to brackets 118. More specifically, chains 114 are suspended from conveyor 110 with sufficient slack to enable hooks 116 to be coupled to brackets 118. One or more of hooks 116 may be coupled to the respective bracket 118 using a positioning arm 120, which enables a user to manipulate a hook 116 into engagement with a bracket 118 in a relatively inaccessible portion of automotive component 104 (e.g., in the middle of automotive component 104). After hooks 116 are coupled to brackets 118, chains 114 are raised (e.g., conveyor 110 is raised or a length of chains 114 is reduced) such that automotive component 104 is suspended from conveyor 110 and can be transported to different stations of assembly line 100.

Figure 2:
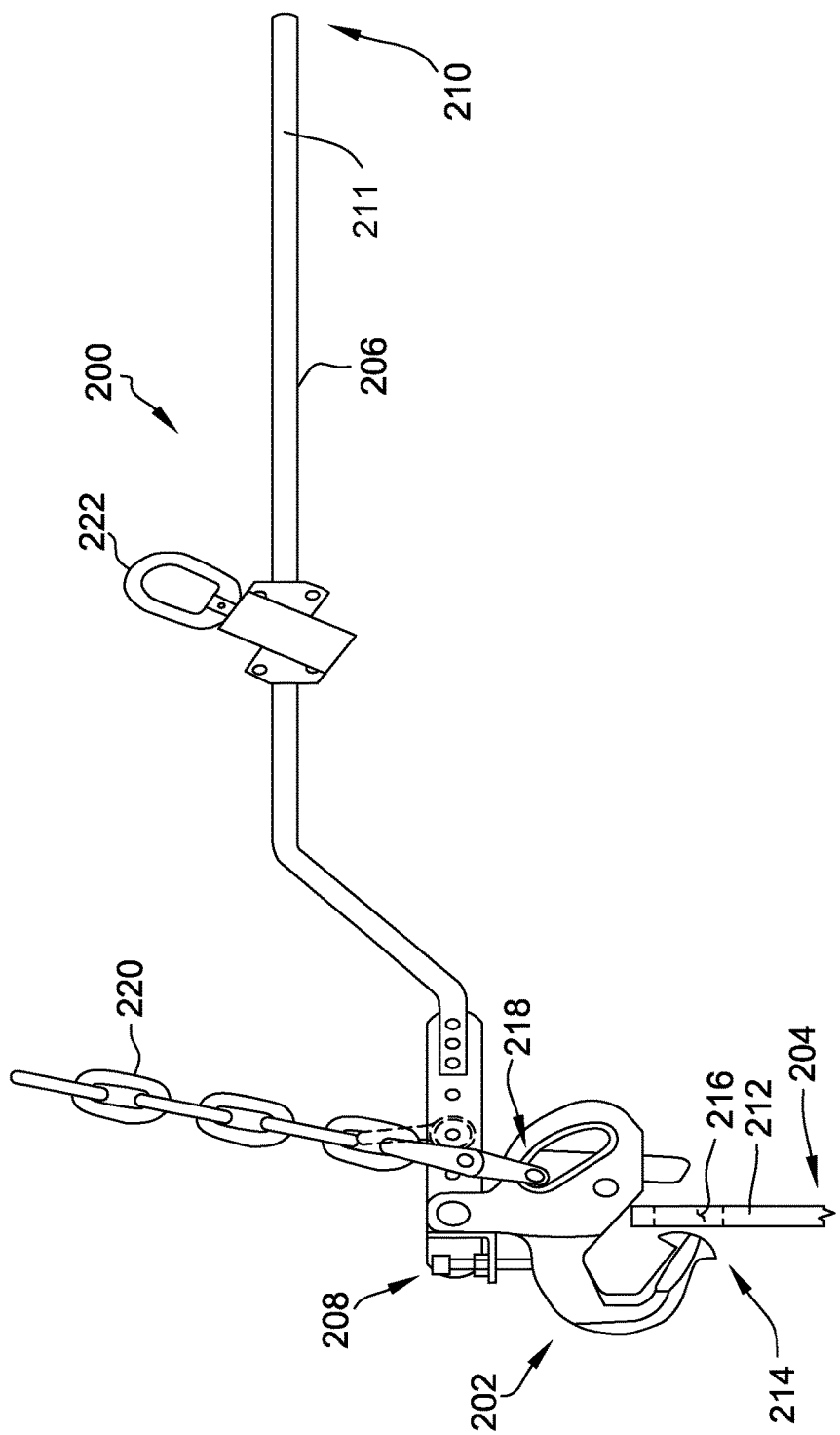
FIG. 2 is a side view of an exemplary hook handling apparatus for coupling a hook to a component.

FIG. 2 is a side view of an exemplary hook handling apparatus 200 for coupling a hook 202 (e.g., hook 116 as shown in FIG. 1) to a component 204 (e.g., automotive component 104 as shown in FIG. 1), which may be used with transport system 102 shown in FIG. 1. In one embodiment, component 204 is an automotive engine, and the hook handling apparatus 200 is configured to couple hook 202 to the engine to move the engine between stations of automotive assembly line 100 (shown in FIG. 1). In the exemplary embodiment, hook handling apparatus 200 includes a positioning arm 206 (e.g., positioning arm 120 as shown in FIG. 1) and hook 202. Positioning arm 206 has a first or distal end 208 and a second or proximal end 210. Hook 202 is pivotably coupled to positioning arm first end 208. Positioning arm second end 210 includes a handle 211 that may be engaged by a user (not shown) and, in some embodiments, may further include a grip (not shown). In one embodiment, the user grasps positioning arm second end 210 to move hook 202 towards a first portion 212 (e.g., bracket 118 as shown in FIG. 1) of component 204 to be lifted. Specifically, to couple hook 202 to component 204, the user couples hook 202 to positioning arm 206 such that hook 202 is in a first, open configuration, shown in FIG. 2. The user positions a free end 214 of hook 202 within an opening 216 defined by first portion 212 of component 204. A free end 218 of a chain 220 (e.g., chain 114 as shown in FIG. 1) is coupled to hook 202, such that, once hook 202 is positioned by the user, chain 220 may be raised to engage first portion 212 of component 204 with hook 202. Engaging first portion 212 with hook 202 applies a load to hook 202, thereby causing hook 202 to rotate or pivot relative to positioning arm 206, and transition hook 202 into a second, closed configuration (shown in FIG. 4), as described further herein. In the exemplary embodiment, positioning arm 206 also includes a spring tension device 222. Spring tension device 222 may be coupled to another component (not shown) to carry the weight of hook 202, such that the user may more easily manipulate hook 202 into a desired position and/or orientation.

Figure 3:
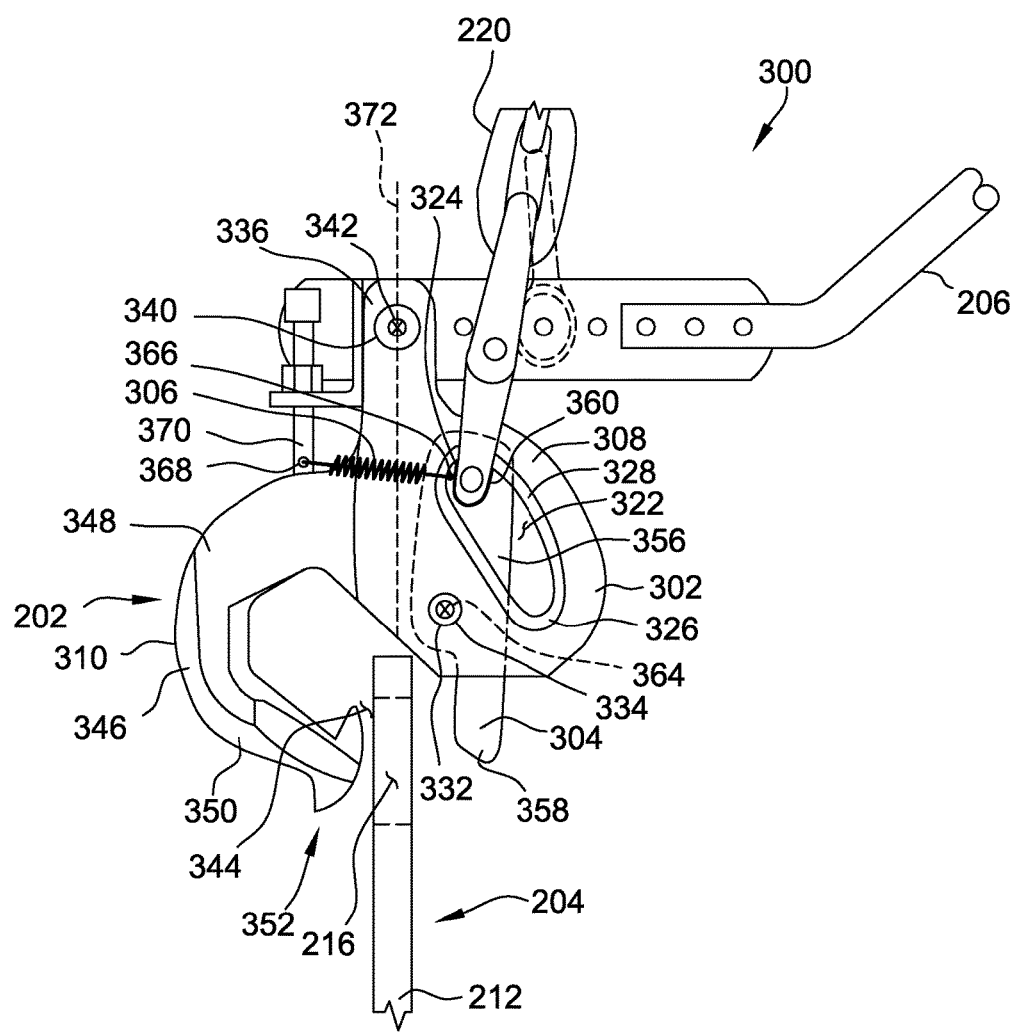
FIG. 3 is an enlarged view of the apparatus shown in FIG. 2 illustrating an exemplary hook in a first, open position.
Figure 4:
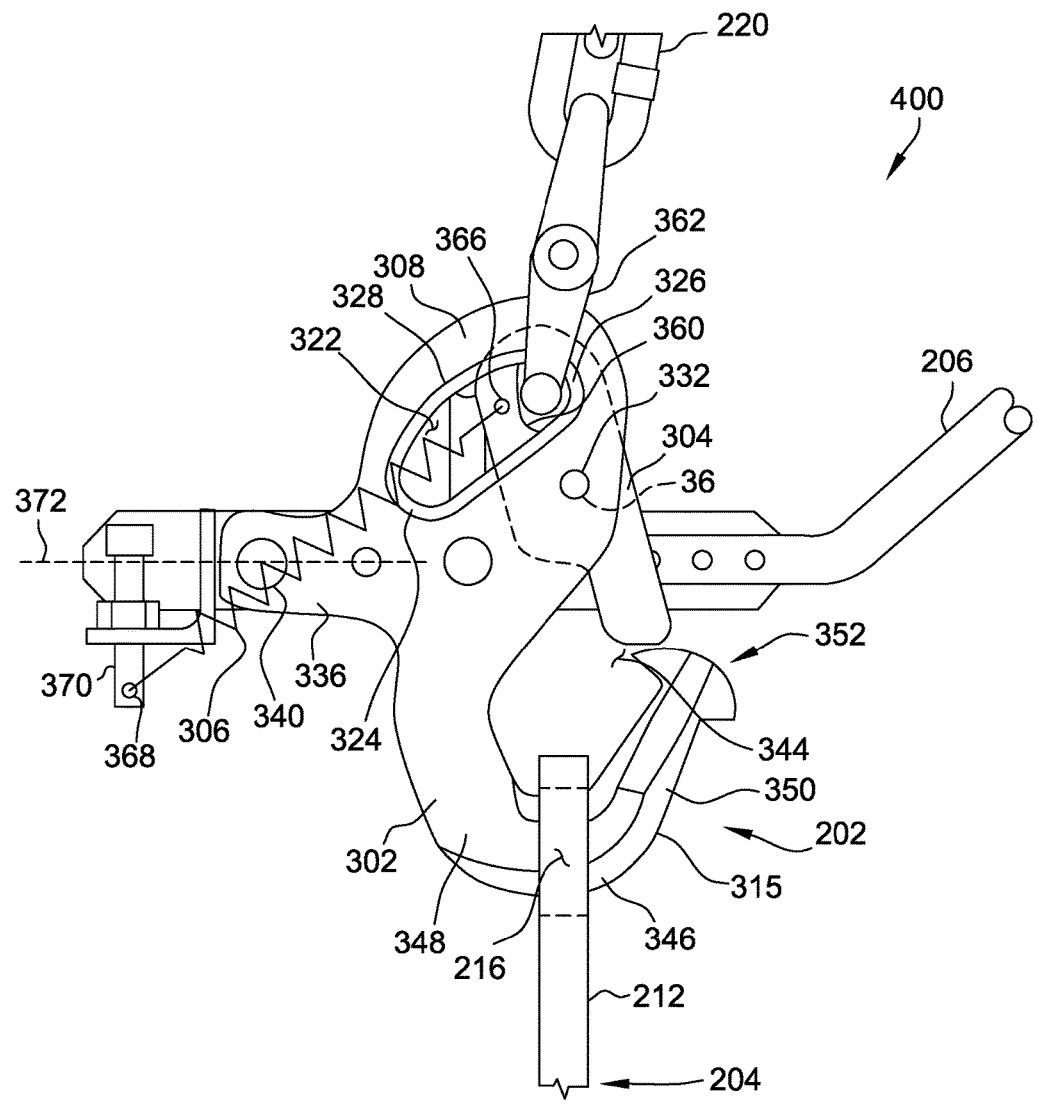
FIG. 4 is another enlarged view of the apparatus shown in FIG. 2 illustrating the hook in a second, closed position.
Figure 5:
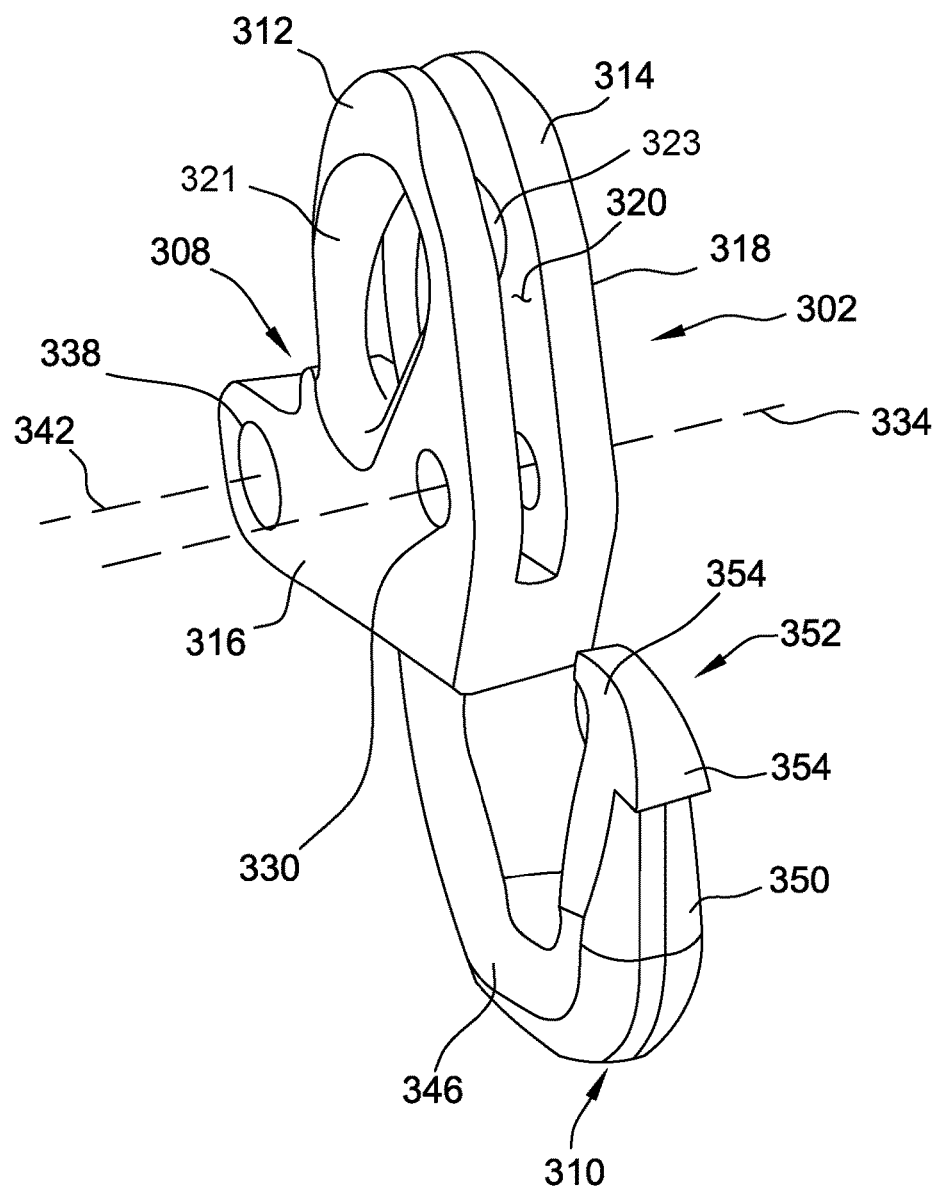
FIG. 5 is a perspective view of a hook body of the hook shown in FIGS. 2-4.

FIG. 3 is an enlarged view of hook handling apparatus 200 shown in FIG. 2 illustrating hook 202 in the first, open configuration 300, and FIG. 4 illustrates hook 202 in the second, closed configuration 400 for lifting component 204. FIG. 5 is a perspective view of a hook body 302 of hook 202. In the exemplary embodiment, hook 202 includes hook body 302, a latch 304, and a biasing element 306 (shown in FIGS. 3 and 4).

Hook body 302 includes a coupling portion 308 for coupling hook body 302 (and, thereby, hook 202) to chain 220. Hook body 302 also includes an engaging portion 310 extending from coupling portion 308 for engaging hook 202 with component 204 to be lifted. In the exemplary embodiment, coupling portion 308 and engaging portion 310 are integrally formed as a single piece. In other embodiments, coupling portion 308 and engaging portion 310 may be independently formed and coupled together to form hook body 302. With reference to FIG. 5, coupling portion 308 includes two laterally-spaced arms 312, 314 that define a first face 316 and an opposing second face 318, respectively, of coupling portion 308. Arms 312, 314 also define a slot 320 therebetween. Coupling portion 308 also includes an elongate aperture 322 (FIGS. 3 and 4) defined therein for receiving at least a portion of chain 220. Elongate aperture 322 is defined in both arms 312, 314 of coupling portion 308. More specifically, elongate aperture 322 includes a first elongate aperture 321 defined by first arm 312 and a second elongate aperture 323 defined by second arm 314 and aligned with first elongate aperture 321. First and second elongate apertures 321, 323 are collectively referred to as elongate aperture 322. In the exemplary embodiment, to form hook 202, latch 304 is positioned between arms 312, 314, and within slot 320. In an alternative embodiment, hook body 302 includes only one of arms 312, 314 or otherwise does not define a slot. In such an embodiment, latch 304 is coupled to hook body 302 against one of faces 316, 318 of hook body 302.

With additional reference to FIGS. 3 and 4, elongate aperture 322 has a first end 324 and an opposing second end 326. In the exemplary embodiment, elongate aperture 322 has an arcuate edge 328. Arcuate edge 328 is sized and oriented to accommodate an arcuate path of chain 220 and latch 304 when a load is applied to hook 202, as described further herein. In the exemplary embodiment, coupling portion 308 also includes a pin channel 330 (see FIG. 5) defined therethrough. Pin channel 330 is sized and shaped for receiving a pin 332 therein. Pin 332 couples latch 304 to hook body 302. In addition, pin 332 defines a pivot axis 334 about which latch 304 pivots with respect to hook body 302. Coupling portion 308 also includes an extension 336 having a fastener channel 338 defined therein. Fastener channel 338 is sized and shaped for receiving a fastener 340 therein. Fastener 340 couples hook body 302 to positioning arm 206, and defines a pivot axis 342 about which hook body 302 (and, thereby, hook 202) pivots with respect to positioning arm 206.

Engaging portion 310 defines an opening 344 sized for receiving first portion 212 of component 204, such that hook 202 may lift component 204. More particularly, engaging portion 310 is generally U-shaped. Engaging portion 310 includes a base 346 and two legs 348, 350 extending therefrom. A first leg 348 extends from coupling portion 308 to base 346, and a second leg 350 extends from base 346 to a free end 352. Second leg free end 352 may also be referred to as a free end 352 of hook body 302, a free end 352 of hook 202 (e.g., free end 214, shown in FIG. 2), and/or a "free end" 352 generally. Free end 352 includes at least one extension 354 (see FIG. 5) that facilitates preventing hook 202 from de-coupling from first portion 212 of component 204 while hook 202 is lifting component 204 (e.g., while hook 202 is transitioned from first configuration 300 to second configuration 400 in response to a load being applied thereto). First leg 348, base 346, and second leg 350 define a U shape of engaging portion 310. As described further herein, latch 304 is pivotable between a first position (corresponding to hook first configuration 300) and a second position (corresponding to hook second configuration) relative to hook body 302 in response to a load being applied to hook 202, wherein latch 304 occludes hook opening 344 in the second position.

Hook latch 304 includes a first portion 356 (FIG. 3) and a second portion 358 (FIG. 3), also referred to herein as an "arm", extending from first portion 356 and out of slot 320. Latch arm 358 occludes hook opening 344 when a load is applied to hook 202. First portion 356 defines a chain aperture 360 sized for receiving a link 362 of chain 220 therein. Chain aperture 360 is aligned with elongate aperture 322. More particularly, to form hook 202, latch 304 is positioned within slot 320 such that chain aperture 360 is aligned with elongate aperture 322 (i.e., with first and second elongate apertures 321, 323). First portion 356 also includes a pin aperture 364 defined therein sized for receiving pin 332 therethrough, to pivotably couple latch 304 to hook body 302.

Biasing element 306 biases hook 202 towards first configuration 300 such that, when no load is applied to hook 202, hook 202 moves towards the first configuration. More particularly, biasing element 306 biases latch 304 towards a first position as illustrated in FIG. 3. In the illustrated embodiment, biasing element 306 is embodied as a spring. In an alternative embodiment, biasing element 306 may be embodied as an alternative component. Biasing element 306 has a first end 366 coupled to latch 304 and an opposing second end 368 coupled to positioning arm 206. Specifically, positioning arm 206 includes a stop 370 extending therefrom. Stop 370 facilitates limiting rotation of hook 202 with respect to positioning arm 206, past the position of hook 202 in first configuration 300 in a clockwise direction relative to the view of FIG. 3.

Hook 202 illustrated in FIGS. 2-4 may be assembled by positioning latch 304 relative to hook body 302 to align chain aperture 360 with elongate aperture 322, coupling latch 304 to hook body 302, and coupling biasing element 306 to latch 304 to bias latch 304 towards the first position (shown in FIG. 3). In some embodiments, coupling latch 304 to hook body 302 includes coupling latch 304 to hook body 302 using pin 332. Additionally or alternatively, coupling latch 304 to hook body 302 includes coupling chain 220 to hook 202 through elongate aperture 322 and chain aperture 360 such that at least a portion of chain 220 extends through each of elongate aperture 322 and chain aperture 360 and causes latch 304 to pivot between a first position and a second position relative to hook body 302, in response to a load being applied to hook 202.

With reference to FIG. 3, hook 202 is shown in the first configuration 300, which corresponds to hook 202 having no load applied thereto. In the first configuration 300, hook engaging portion 310 contacts positioning arm stop 370. Hook body 302 is substantially perpendicular to positioning arm 206, with respect to a hook axis 372 as defined in FIG. 3. Latch arm 358 is spaced from hook free end 352, and chain aperture 360 is positioned at first end 324 of elongate aperture 322. In addition, biasing element 306 is in a relaxed or retracted configuration. The relative positions of hook body 302 and latch 304 when hook 202 is in first configuration 300 may be referred to as the "first positions" of hook body 302 and latch 304.

When a load is applied to hook 202 (e.g., component 204 is lifted) hook 202 transitions from first configuration 300 (FIG. 3) to second configuration 400 (FIG. 4). As the load is applied, chain 220 is simultaneously tightened to facilitate lifting the load (e.g., lifting component 204). Second leg 350 of hook body engaging portion 310 engages first portion 212 of component 204. As chain 220 tightens, chain 220 exerts an upward (with respect to the views of FIGS. 3 and 4) force on coupling portion 308 and latch 304. In response, hook 202 pivots about pivot axis 342 with respect to positioning arm 206. First portion 212 of component 204 is urged along second leg 350 toward base 346 of engaging portion 310. As the load overcomes a spring force exerted by biasing element 306, latch first portion 356 is drawn upwards, and chain aperture 360 traverses elongate aperture 322, thereby pivoting latch 304 with respect to hook body 302. Latch arm 358 rotates towards free end 352 of hook 202 to substantially close or occlude hook opening 344.

With reference to FIG. 4, hook 202 is shown in second configuration 400, which corresponds to hook 202 having a load applied thereto (e.g., hook 202 lifting component 204). In second configuration 400, hook engaging portion 310 is spaced from positioning arm stop 370. Hook body 302 is oriented substantially parallel to positioning arm 206. Latch arm 358 is in contact with, is relatively near to, and/or is oriented towards free end 352 of hook 202 to occlude or substantially close hook opening 344, such that first portion 212 of component 204 is securely retained within hook opening 344. In addition, chain aperture 360 is positioned at second end 326 of elongate aperture 322. Biasing element 306 is in a stretched or extended configuration, as the load of component 204 is greater than the spring force of biasing element 306. The relative positions of hook body 302 and latch 304 when hook 202 is in second configuration 400 may be referred to as the "second positions" of hook body 302 and latch 304.

Embodiments of the hooks described herein facilitate securely closing a hook opening whenever a load is applied to the hook. Specifically, the hook includes a latch that pivots with respect to a hook body from a first position to a second position when the load is applied to the hook, rotating the latch to occlude the hook opening in the second position. Occluding the hook opening facilitates preventing the load from de-coupling from the hook then the load is lifted by the hook.

Exemplary embodiments of hooks and methods of using the same are described herein. The systems and methods described herein are not limited to the specific embodiments described herein, but rather, components of the systems and/or steps of the methods may be utilized independently and separately from other components and/or steps described herein.

This written description uses examples to illustrate the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A hook for lifting a component, said hook comprising:
    a hook body comprising:
        a coupling portion having an elongate aperture defined therein for receiving at least a portion of a chain; and
        an engaging portion extending from said coupling portion, said engaging portion defining a hook opening sized for receiving a first portion of the component therein; and
    a unitary latch pivotably coupled to said coupling portion and pivotable between a first position and a second position relative to said hook body, said unitary latch occluding the hook opening in the second position, wherein said unitary latch includes a chain aperture defined therein that is aligned with said elongate aperture such that the portion of the chain extends through each of said elongate aperture and said chain aperture and causes said unitary latch to pivot between the first and second positions in response to a load being applied to said hook.

2. The hook in accordance with claim 1, wherein said unitary latch comprises:
    a first portion that includes said chain aperture defined therein; and
    an arm extending from said first portion of said unitary latch, wherein said arm occludes the hook opening when said unitary latch is in the second position.

3. The hook in accordance with claim 1 further comprising a biasing element coupled to said unitary latch and biasing said unitary latch towards the first position such that the hook opening is open when no load is applied to said hook.

4. The hook in accordance with claim 1 further comprising a pin coupling said unitary latch to said hook body, wherein said pin defines a pivot axis about which said unitary latch pivots with respect to said hook body, wherein said pivot axis is the only axis about which said unitary latch pivots.

5. The hook in accordance with claim 1, wherein said chain aperture is aligned with a first end of said elongate aperture when said unitary latch is in the first position, and wherein said chain aperture is aligned with an opposing second end of said elongate aperture when said unitary latch is in the second position.

6. The hook in accordance with claim 1, wherein said coupling portion comprises a pair of laterally-spaced arms that define a slot therebetween, wherein said elongate aperture is a first elongate aperture defined by a first arm of said pair of arms, wherein a second arm of said pair of arms defines a second elongate aperture aligned with said first elongate aperture.

7. The hook in accordance with claim 6, wherein said unitary latch is positioned within said slot such that said chain aperture is aligned with each of said first and second elongate apertures.

8. The hook in accordance with claim 1, wherein said engaging portion of said hook body is fixedly coupled to said coupling portion of said hook body.

9. An apparatus for coupling a component to a transport system, said apparatus comprising:
a positioning arm having a first end and an opposing second end, said positioning arm comprising a handle at said first end; and
a hook coupled to said second end of said positioning arm, said hook comprising:
a hook body comprising:
a coupling portion having an elongate aperture defined therein for receiving at least a portion of a chain; and
an engaging portion extending from said coupling portion, said engaging portion defining a hook opening sized for receiving a first portion of the component therein; and
a latch pivotably coupled to said coupling portion and pivotable between a first position and a second position relative to said hook body, said latch occluding the hook opening in the second position, wherein said latch defines a chain aperture that is aligned with said elongate aperture such that the portion of the chain extends through each of said elongate aperture and said chain aperture and causes said latch to pivot between the first and second positions in response to a load being applied to said hook.

10. The apparatus in accordance with claim 9 further comprising a fastener pivotably coupling said hook body to said positioning arm, wherein said fastener defines a pivot axis about which said hook body pivots with respect to said positioning arm.

11. The apparatus in accordance with claim 9, wherein said positioning arm comprises a stop extending therefrom, wherein said stop limits pivoting of said hook body.

12. The apparatus in accordance with claim 11 further comprising a biasing element coupled to said latch and biasing said latch towards the first position, wherein said biasing element comprises a first end and an opposing second end, said first end coupled to said latch and said second end coupled to said stop.

13. The apparatus in accordance with claim 9, further comprising a biasing element coupled to said latch and biasing said latch towards the first position, wherein said biasing element comprises a first end and an opposing second end, said first end coupled to said latch and said second end coupled to said positioning arm.

14. The apparatus in accordance with claim 9, wherein said latch comprises:
a first portion that defines said chain aperture; and
an arm extending from said first portion of said latch, wherein said arm occludes the hook opening when said latch is in the second position.

15. The apparatus in accordance with claim 9 further comprising a pin coupling said latch to said hook body, wherein said pin defines a pivot axis about which said latch pivots with respect to said hook body.

16. The apparatus in accordance with claim 9, wherein said chain aperture is aligned with a first end of said elongate aperture when said latch is in the first position, and wherein said chain aperture is aligned with an opposing second end of said elongate aperture when said latch is in the second position.

17. A method of assembling a hook, said method comprising:
positioning a unitary latch relative to a hook body such that a chain aperture defined in the unitary latch is aligned with an elongate aperture defined in a coupling portion of the hook body, wherein the hook body includes an engaging portion extending from the coupling portion and defining a hook opening sized for receiving a portion of a component therein; and
pivotably coupling the unitary latch to the hook body such that the unitary latch is pivotable between a first position and a second position relative to said hook body in response to a load being applied to the hook, wherein the unitary latch occludes the hook opening in the second position.

18. The method in accordance with claim 17, wherein coupling the unitary latch to the hook body comprises coupling the unitary latch to the hook body using a pin that defines a pivot axis about which the unitary latch pivots with respect to the hook body, wherein the pivot axis is the only axis about which said unitary latch pivots.

19. The method in accordance with claim 17 further comprising coupling a chain to the hook such that a portion of the chain extends through each of the elongate aperture and the chain aperture.

20. The method in accordance with claim 17 further comprising coupling a biasing element to the unitary latch to bias the unitary latch toward a first position in which the hook opening is open for receiving the portion of the component.

21. The method in accordance with claim 17, wherein the hook body includes a pair of laterally spaced arms that define a slot therebetween, and wherein positioning a unitary latch relative to a hook body comprises positioning the unitary latch within the slot.

* * * * *